US012698226B2

(12) United States Patent
Saint-Vincent et al.

(10) Patent No.: US 12,698,226 B2
(45) Date of Patent: Aug. 4, 2026

(54) CARWASH AND WASTEWATER REGENERATION SYSTEM

(71) Applicant: ShockWater CarWash Systems, LLC, New Braunfels, TX (US)

(72) Inventors: Stephen Saint-Vincent, New Braunfels, TX (US); Gerard J. Broussard, St. Martinville, LA (US)

(73) Assignee: ShockWater CarWash Systems, LLC, New Braunfels, TX (US)

( * ) Notice: Subject to any disclaimer, the term of this patent is extended or adjusted under 35 U.S.C. 154(b) by 0 days.

(21) Appl. No.: 17/484,717

(22) Filed: Sep. 24, 2021

(65) Prior Publication Data

US 2022/0098074 A1 Mar. 31, 2022

Related U.S. Application Data

(60) Provisional application No. 63/083,612, filed on Sep. 25, 2020.

(51) Int. Cl.
| | |
|---|---|
| *C02F 9/00* | (2023.01) |
| *C02F 1/00* | (2023.01) |
| *C02F 1/38* | (2023.01) |
| *C02F 1/467* | (2023.01) |
| *C02F 1/76* | (2023.01) |

(Continued)

(52) U.S. Cl.
CPC ................ *C02F 9/00* (2013.01); *C02F 1/004* (2013.01); *C02F 2001/007* (2013.01); *C02F 1/38* (2013.01); *C02F 1/4672* (2013.01); *C02F 1/76* (2013.01); *C02F 1/78* (2013.01); *C02F*

*2103/44* (2013.01); *C02F 2201/005* (2013.01); *C02F 2301/043* (2013.01)

(58) Field of Classification Search
CPC .... C02F 9/00; C02F 1/004; C02F 1/38; C02F 1/4672; C02F 1/76; C02F 1/78; C02F 2001/007; C02F 2103/44; C02F 2201/005; C02F 2301/043
See application file for complete search history.

(56) References Cited

U.S. PATENT DOCUMENTS

| | | | | |
|---|---|---|---|---|
| 9,422,181 B1 * | 8/2016 | Borchard | ............. | B01D 21/267 |
| 10,696,575 B1 * | 6/2020 | Pyle | ........................... | C02F 9/00 |

(Continued)

FOREIGN PATENT DOCUMENTS

| | | |
|---|---|---|
| AU | 2019216606 A1 | 5/2020 |
| CN | 206359356 U | 7/2017 |
| SE | 525175 C2 | 12/2024 |

OTHER PUBLICATIONS https://www.doityourself.com/stry/8-advantages-of-a-dual-dc-power-supply (Feb. 7, 2018) (Year: 2018).*

(Continued)

*Primary Examiner* — Benjamin L Lebron
*Assistant Examiner* — Bernadette Karen Mcgann

(57) ABSTRACT

A means and method of treating wastewater generated during the washing of on road and off-road vehicles by means of a filtration, advanced oxidation and post process filtration to produce a water consisting of near neutral pH, Low Total Dissolved Solids, Low Total Suspended Solids, Low Iron, Low Calcium Carbonate (CaCO3), Low Bacteria, Low Sulfur and high clarity, such that the water is suited for all commercial vehicle washing operations.

18 Claims, 7 Drawing Sheets

(51) Int. Cl.
  *C02F 1/78* (2023.01)
  *C02F 103/44* (2006.01)

(56) References Cited

U.S. PATENT DOCUMENTS

| | | | |
|---|---|---|---|
| 2010/0307984 A1 | 12/2010 | Mortensen | |
| 2014/0048466 A1* | 2/2014 | McGuire | C02F 1/4672 |
| | | | 210/170.09 |
| 2015/0166383 A1* | 6/2015 | Visnja | B01D 21/00 |
| | | | 204/229.4 |
| 2020/0232104 A1* | 7/2020 | Tax | C25B 11/097 |

OTHER PUBLICATIONS

Introduction To Arbitrary/Function Generator 2005 Department of Electrical and Computer Engineering at Portland State University https://download.tek.com/document/75W_24502_0.pdf (Year: 2005).*

International Search Report and Written Opinion dated Dec. 27, 2021, for International Application No. PCT/US2021/051938, 17 pages.

Fontana, Mars G., Corrosion Engineering, McGraw-Hill Series in Materials Science and Engineering, 1987, Third Edition, McGraw-Hill Book Co., Singapore.

European Search Report for EP21873512.

\* cited by examiner

| Table 1. Raw Water and Treated Water Chemical Analysis | | | | | |
|---|---|---|---|---|---|
| | Units | Raw Water Baton Rouge | Raw Water Denver | Treated Baton Rouge | Treated Denver |
| Temp | °F | 72 | 72 | 72 | 72 |
| pH | | 12 | 10 | 6.8 | 7.0 |
| TDS | mg/L | 130 | 280 | <1 | <1 |
| Hardness $CaCO_3$ | mg/L | 274 | 120 | 2 | 2 |
| Ba (Barium) | mg/L | <1 | <1 | <1 | <1 |
| Sr (Strontium) | mg/L | <1 | <1 | <1 | <1 |
| Ca (Calcium) | mg/L | 10 | 17 | <1 | <1 |
| Fe (Iron) | mg/L | 4 | 7 | <1 | <1 |
| Mg (Magnesium) | mg/L | <1 | 2 | <1 | <1 |
| K (Potassium) | mg/L | 3 | 9 | <1 | <1 |
| B (Boron) | mg/L | <1 | <1 | <1 | <1 |
| Na (Sodium) | mg/L | <1 | 2 | <1 | <1 |
| As (Arsenic) | mg/L | <1 | <1 | <1 | <1 |
| Cl (Chlorine) | mg/L | 3.80 | 2.50 | 1.00 | 2.00 |
| TSS | mg/L | 19 | 35 | <1 | <1 |
| TOG | mg/L | 13 | 18 | <1 | <1 |

FIG. 6

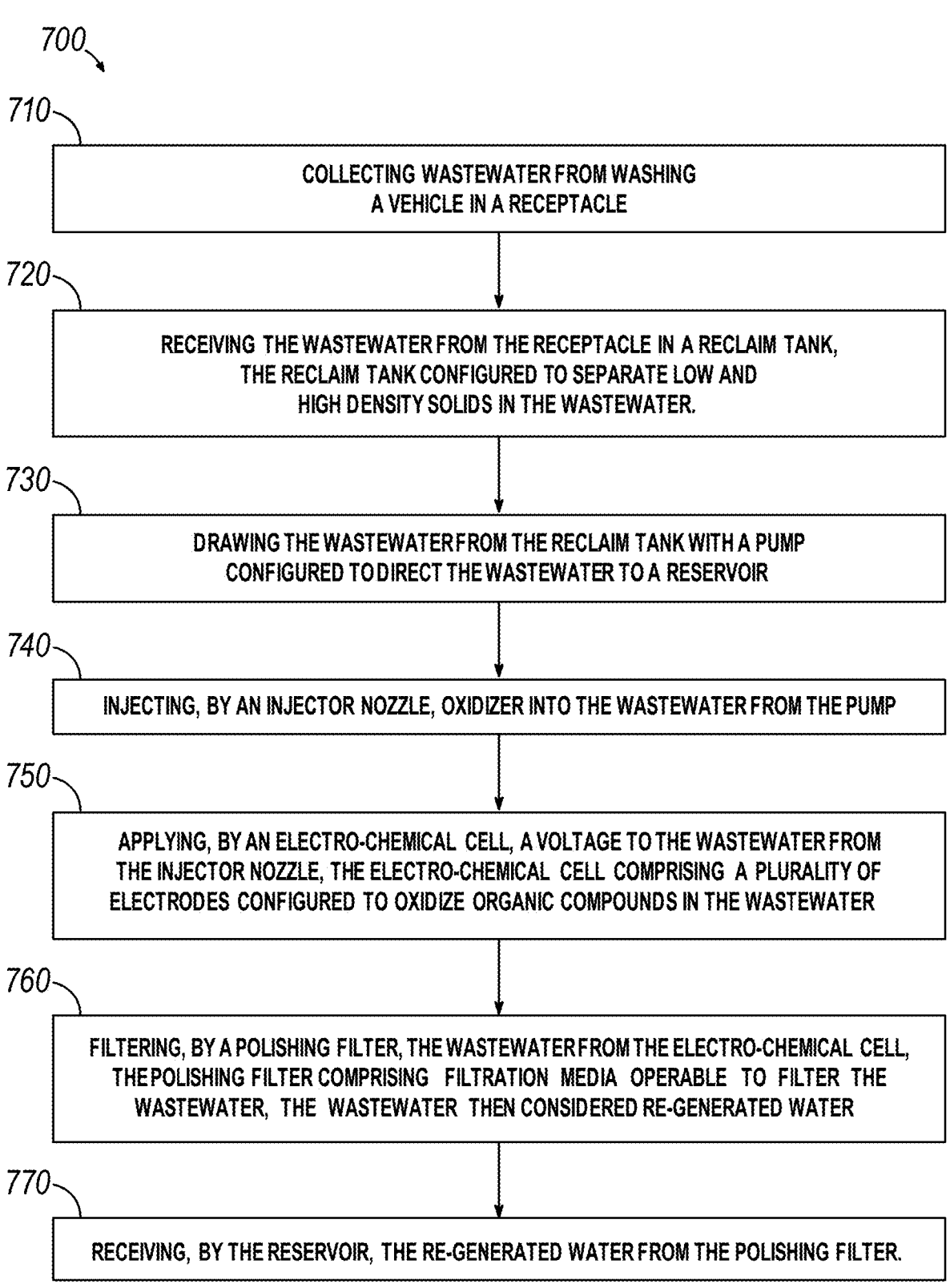

700

710 — COLLECTING WASTEWATER FROM WASHING A VEHICLE IN A RECEPTACLE

720 — RECEIVING THE WASTEWATER FROM THE RECEPTACLE IN A RECLAIM TANK, THE RECLAIM TANK CONFIGURED TO SEPARATE LOW AND HIGH DENSITY SOLIDS IN THE WASTEWATER.

730 — DRAWING THE WASTEWATER FROM THE RECLAIM TANK WITH A PUMP CONFIGURED TO DIRECT THE WASTEWATER TO A RESERVOIR

740 — INJECTING, BY AN INJECTOR NOZZLE, OXIDIZER INTO THE WASTEWATER FROM THE PUMP

750 — APPLYING, BY AN ELECTRO-CHEMICAL CELL, A VOLTAGE TO THE WASTEWATER FROM THE INJECTOR NOZZLE, THE ELECTRO-CHEMICAL CELL COMPRISING A PLURALITY OF ELECTRODES CONFIGURED TO OXIDIZE ORGANIC COMPOUNDS IN THE WASTEWATER

760 — FILTERING, BY A POLISHING FILTER, THE WASTEWATER FROM THE ELECTRO-CHEMICAL CELL, THE POLISHING FILTER COMPRISING FILTRATION MEDIA OPERABLE TO FILTER THE WASTEWATER, THE WASTEWATER THEN CONSIDERED RE-GENERATED WATER

770 — RECEIVING, BY THE RESERVOIR, THE RE-GENERATED WATER FROM THE POLISHING FILTER.

FIG. 7

CARWASH AND WASTEWATER REGENERATION SYSTEM

CROSS REFERENCE TO RELATED INFORMATION

This application claims the benefit of U.S. Provisional Patent Application No. 63/083,612, filed Sep. 25, 2020, titled Carwash Wastewater Regeneration System, the contents of which are hereby incorporated herein in its entirety.

TECHNICAL FIELD

The present disclosure is directed to wastewater recycling systems for carwashes.

BACKGROUND OF THE INVENTION

Growing municipalities bring increased demand for fresh water and wastewater treatment facilities. The growth of communities brings increasing number of vehicles with the attendant servicing requirements, including commercial washing systems. Conventional vehicle wash systems are categorized into two primary classes: automatics and self-service. Automatic carwashes are typified by tunnel systems where the vehicle is transferred through washing system. In self-service systems the washing system is manipulated around the stationary vehicle.

BRIEF SUMMARY OF THE INVENTION

One embodiment under the present disclosure is a vehicle washing system. The system can comprise a receptacle for wastewater; a reclaim tank configured to receive wastewater from the receptacle and to separate low and high density solids in wastewater; and a pump operable to draw wastewater from the reclaim tank. It can further comprise an injector nozzle fluidly coupled downstream of the pump and operable to introduce oxidizer into the wastewater; a bypass circuit fluidly coupled in parallel to the injector nozzle and having lower flow resistance than the injector nozzle, the bypass circuit comprising a control valve operable to vary flow rate in the injector nozzle; a junction fluidly coupled downstream of the bypass circuit and the injector nozzle; and an electro-chemical cell fluidly coupled downstream of the junction and comprising a plurality of electrodes capable of generating a voltage configured to oxidize organic compounds when applied to the wastewater. It can further comprise a polishing filter fluidly coupled downstream of the electro-chemical cell and comprising a pressure vessel and a filtration media operable to filter the wastewater, wherein after the polishing filter the wastewater has become re-generated water; a reservoir fluidly coupled downstream of the polishing filter and operable to store re-generated water; and a washing apparatus fluidly coupled downstream of the reservoir and operable to apply the re-generated water to a vehicle.

Another embodiment can comprise a system for re-generating wastewater in a vehicle washing system. The system can comprise a receptacle for wastewater; a reclaim tank configured to receive wastewater from the receptacle; and a pump operable to draw wastewater from the reclaim tank. It can further comprise an injector nozzle fluidly coupled downstream of the pump and operable to introduce oxidizer into the wastewater; an electro-chemical cell fluidly coupled downstream of the injector nozzle and comprising a plurality of electrodes capable of generating a voltage configured to oxidize organic compounds when applied to the wastewater; and a polishing filter fluidly coupled downstream of the electro-chemical cell and comprising filtration media operable to filter the wastewater, wherein after the polishing filter the wastewater has become re-generated water.

Another embodiment under the present disclosure can comprise a method of re-generating water. The method can comprise collecting wastewater in a receptacle; receiving the wastewater from the receptacle in a reclaim tank, the reclaim tank configured to separate low and high density solids in the wastewater; drawing the wastewater from the reclaim tank with a pump configured to direct the wastewater to a reservoir; and injecting, by an injector nozzle, oxidizer into the wastewater from the pump. The method can further comprise applying, by an electro-chemical cell, a voltage to the wastewater from the injector nozzle, the electro-chemical cell comprising a plurality of electrodes configured to oxidize organic compounds in the wastewater; filtering, by a polishing filter, the wastewater from the electro-chemical cell, the polishing filter comprising filtration media operable to filter the wastewater, the wastewater then considered re-generated water; and receiving, by the reservoir, the re-generated water from the polishing filter.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 6 shows a table of experimental results using the teachings of the present disclosure.

FIG. 7 shows a method embodiment of re-generating water.

DETAILED DESCRIPTION OF THE INVENTION

Figure 1:
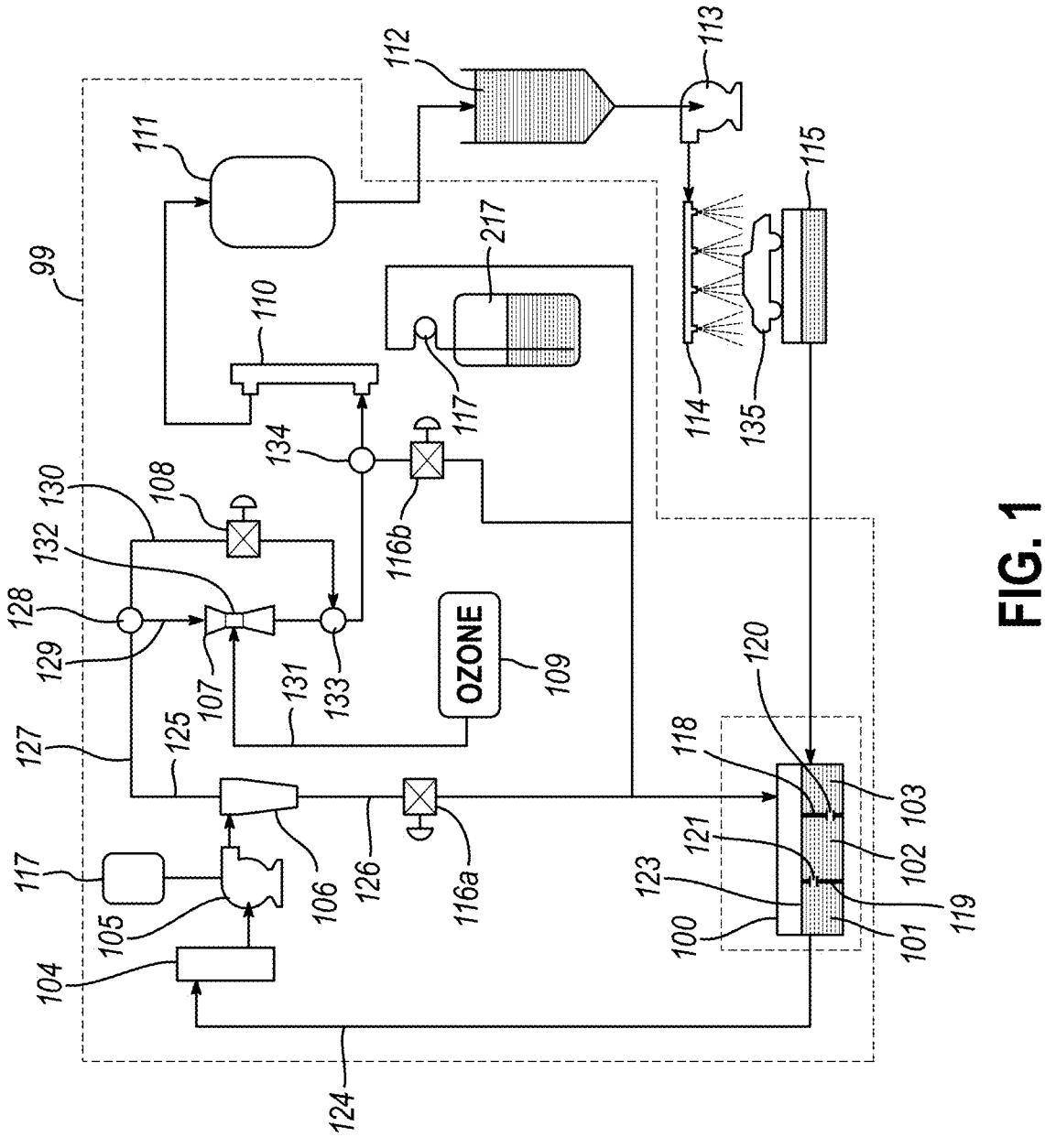
FIG. 1 shows an embodiment of a water re-generation process under the present disclosure.

For both self-service and automatic car washes, the volume of water consumed is significant, typically from 50-150 gallons per wash cycle. Large volume car wash service companies treat between 3,000-10,000 cars per month. Hence the freshwater demand on municipal water supply is significant, 150,000-over 1,000,000 gallons per month. Correspondingly, approximately 70% of the freshwater demand is being sent to municipal wastewater treatment systems. Further the wastewater sent to the municipal treatment plant has high levels of Total Solids both dissolved and suspended. The solid loading is typically dirt, surfactants, waxes, bacteria, and oil and grease. The Total Solids are typically high Carbon Oxygen Demand (COD) compounds that reduce the efficiency of the municipal wastewater treatment facility.

The car wash industry strives to achieve a spotless shine and a satisfied customer. The chemical additives for cleaning and subsequent polishing require high quality of water with neutral pH balance, low total hardness (CaCO3), low Total Dissolved Solids (TDS), low Total Suspend Solids (TSS), low iron (Fe), low Carbon Oxygen Demand (COD), low bacteria and high clarity. Meeting these requirements, most commercial car wash operations utilize water softener to reduce water hardness of the incoming municipal fresh water. The softened water increases the cleaning activity of the soaps and detergents to more efficiently remove dirt from the vehicle being washed. However, the municipal supplied water is not sufficiently low TDS to meet spot free cleaning requirements.

Typically, car wash operators will generate low TDS water utilizing reverse osmosis filtration systems. Permeate water, that which has passed through the membrane is used for spot free operations in the wash cycle. Concentrate, water that is rejected by the membrane is typically sent to sewage because of the high residual TDS, which has low cleaning efficiency. Biological control of the generated wash water is also a significant operational issue due to malodor and general low hygiene of the washing facility. Common bacteria that grow in the wastewater form hydrogen sulfide causing unpleasant odors and sense of uncleanness. Further, biohazardous biologic activity such as mold will take residence on the interior surfaces of the wash bays creating potential health hazards for operators and customers alike. Additional operational consideration is a persistent biofilm on the floor of the wash bay, the biofilm forming a low friction surface that is hazardous to pedestrian and vehicle traffic. Another operational issue facing commercial vehicle washing operations is the generation of foam for initial cleaning operations and then the removal of foam from water collected in the wash bay trench. Initial foam formation requires low hardness water. Yet, the low hardness also makes foam persistent, overflowing the wash bay trench, sediment separator and discharged to municipal sewage.

The present disclosure relates to wastewater treatment system and, more particularly, to systems and methods for re-generating wastewater created during vehicle washing operations for reuse in vehicle washing.

The present disclosure can comprise a process and method of re-generating wastewater resulting from vehicle washing operations to be suited for all vehicle washing operations, including final spot free rinse. The present disclosure can reduce municipal freshwater consumption up to 80% and nearly eliminate wastewater discharge to municipal sewage. Freshwater from municipal and/or other suitable sources is required to make up water loss due to evaporation and carry off. Possible embodiments under the present disclosure are described below.

Referring now to FIG. 1, an embodiment of a wastewater re-generation system 99 for a car wash, under the present disclosure, can be seen. Reclaim, reclamation, or remediation tank 100 can be comprised of a plurality of compartments 101, 102, 103 formed by baffles 118, 119. A first fluid conduit 120 is placed at an elevation below the median tank water elevation 123. Second fluid conduit 121 is placed just below the median tank water elevation 123.

From reclaim tank 100, fluid can travel by suction line 124 to pump 105. Strainer 104 is placed on the pump 105 where suction line 124 enters. Suction line 124 draws water from the final compartment 101 of the reclaim tank 100, passing the car wash generated wastewater through a strainer 104 before entering the pump 105. The strainer consists of a mesh element that prevents large solid objects such as grit from passing into the pump impeller. Further, the mesh element is useful for collecting polymers, waxes, and other suspended solids from entering the re-generation process. Pump 105 is used to pressurize the water treatment process to cause the liquid under process to be mobilized through the system 99 to be discharged at atmospheric pressure at the clean water reservoir 112. Pump 105 speed can be controlled through a variable frequency drive 117. The liquid discharged from the pump 105 is at high pressure and feeds to a hydrocyclone 106 via fluid conduit 125. In hydrocyclone 106 any high-density solids are rejected to an underflow 126 and discharged back to the reclaim tank 100. Underflow 126 can discharge high density elements from the liquid under process to the reclaim tank 100 in the input compartment 103. The underflow 126 discharge is fluidly conducted to reclaim tank 100 wherein the flow rate is controlled via a throttle valve 116a. The throttle valve 116a is used to maintain adequate pressure in the hydrocyclone 106 to ensure high centrifugal forces for efficient separation of high-density elements and propel the liquid under process to transfer through the entire process until discharged to atmospheric pressure in the clean water reservoir.

The top flow 127 fluidly conducts the liquid under process to a diverter 128 that separates the flow of the liquid under process between ozonation branch 129 and bypass branch 130. Ozonation branch 129 is fluidly connected to injector nozzle 107, in which ozone is injected into the liquid under process. Ozone generator 109 discharges ozone via fluid conduit 131. The inductor nozzle bypass flow rate is controlled to maintain appropriate vacuum pressure in the inductor nozzle to ensure proper ozone injection flow rate. The injection nozzle 107 is drawn into the liquid under process by means of a low-pressure zone at the throat 132 of injection nozzle 107. The mass flow rate of ozone injection is controlled by the low pressure generated at throat 132 by the velocity of the flow through the throat 132. Ozone can be introduced to the liquid under process by means of an injector nozzle 107 such as a Mazzei Nozzle. The injector nozzle 107 can be configured to create a low pressure at the throat (minimum cross section) of the injector nozzle 107 into which various fluids can be injected. The greater the mass flow rate through the injector nozzle 107, the lower the pressure is at the throat. This property can be used to set the maximum injection rate of ozone into the liquid under process. The mass flow rate of bypass branch 130 is controlled by the throttle control valve 108. Restriction of the mass flow rate in bypass branch 130 increases the flow rate through injection nozzle 107. As the flow rate increases in the injection nozzle 107 a lower pressure is generated at throat 132, which increases the mass flow rate of ozone. Those skilled in the art will recognize that the sensing of the low pressure at the injection nozzle 107 can be used to adjust the throttle control valve in the bypass circuit to optimize ozone mass flow rate to meet the oxidation demand of the liquid under process.

The separated flows in the ozonation branch and bypass branch 130 are merged at junction 133, forming a single fluid conduction path. The liquid under process is fluidly conducted to an electro-chemical cell 110. A portion of the liquid under process with additions of ozone is diverted at tee 134 and discharged to the reclaim tank 100 at first compartment 103. The flow rate of the diverted flow through tee 134 is controlled via throttle valve 116b. The diverted flow input ozone into the wastewater held in reclaim tank 100 causing advanced oxidation of the bacteria load and total solids in the wastewater. The electro-chemical cell 110 impresses an electric field potential upon the liquid under process. The electro-chemical cell 110 preferably comprises a series of electrodes that have an applied voltage potential. Electro-chemical cell 110 preferably comprises an even plurality of electrodes, each pair forming a cathode and anode circuit. Dissolved solids in the liquid under process creates an electrically conductive circuit between the electrodes. The electron transfer through the liquid under process creates advanced oxidation radical species such as H(+), OH(−), HOCl, ClO2, O(−), etc. that are highly effective in oxidizing volatile organic compounds such as soaps, waxes, oil and grease. Each electrode can be connected via an electrically conductive circuit to an electronic power supply. The electronic power supply provides either a time invariant voltage or voltage with a time rate of change to the electrodes. The time rate of change can vary, but in a preferred embodiment may be zero (0) to greater than 1 Volt per Micro-Second. The time rate of change may be any arbitrary signal including but not limited to sine, triangle, square wave forms. The electrodes of the present disclosure are preferably Titanium and Titanium coated with Mixed Metal Oxides (MMO) such as those containing Iridium, Platinum and Ruthenium. Those skilled in the art will recognize that other electrically conductive materials can be utilized, even electrically conductive polymers. The liquid under process provides the electrical conduit circuit between the electrode pair (anode and cathode). The electrical conductivity of the liquid under process provides the electrical conduit pathway between the anode and cathode.

After the liquid under process passes through the electro-chemical cell 110 it is fluidly conducted to a polishing filter 111. Polishing filter 111 removes residual suspended solids from the liquid under process, clarifying the liquid. Suspended solids captured by the filtration media is retained until removed by backwashing or other cleaning process. The polishing filter 111 can, depending upon the filtration media used, remove dissolved solids. The polishing filter 111 of the present disclosure is a media filter comprised of a tiered structure of granular media of different density, size, geometry, composition, etc. In the present disclosure the media composition is ¼" screen gravel, glass beads, and a mix of ground walnut and coconut shells. Those skilled in the art will recognize that the composition of media is nearly infinite from naturally available granular media such as sand, ground glass, activated carbon, ground nut shells, etc., and synthetic materials such as resin absorption beads of various polymers, zeolites, etc. It should be known that that the media of this disclosure is not limited to that mentioned in this disclosure summary.

As the liquid under process is discharged from the polishing filter 111 it is reduced to atmospheric pressure into a clean water reservoir 112. Clean water reservoir 112 collects the re-generated water from the process 99 and retains until demand is created by feed pumps 113 for the vehicle washing operation. Re-generated water is fed to washing apparatus 114 to clean vehicle 135. Water, soap, waxes, dirt, oil and grease, and other contaminates are carried off the vehicle 135 and collected in bay trench 115. Bay trench 115 discharges the wastewater to the reclaim tank 100 for the water re-generation process to begin anew.

A dosing pump 117 can be used to feed chemical oxidizer from a chemical additive tank 217 to the reclaim tank 100, such as at the input compartment 103. An example of an oxidizer chemical is Hypochlorous Acid (HOCl). HOCl can be generated by various means, including by electrolysis or by addition of dry, granular Sodium dichloroisocyanurate and Sodium dichloroisocyanurate dihydrate, which when added to water forms Hypochlorous Acid (HOCl). Hypochlorous Acid (HOCl) is highly effective as a disinfecting agent while maintaining a weak acidic pH of 6.5-7.0. The neutral to weak acid pH of the HOCl is well suited to working with the surfactants, waxes and other additives used in vehicle washing operations. The HOCl can be dosed to the reclaim tank 100 to produce a final concentration typically less than 50 ppm and preferably less than 1. HOCl concentration in the water re-generation process is also an effective Biocide, suitable for sanitizing the process tanks, piping, and associated equipment. Alternatively, biological inoculants can be used that have isolated naturally occurring organisms that target and comprehensively degrade petroleum hydrocarbons, surfactants and various other organic components in the wastewater stream. The ideal bacteria groups will have natural genetic pathways to utilize all the carbon chains with producing noxious by-products such as hydrogen sulfide and produce a significantly higher population density in the wastewater versus other competing organisms. Dosing of active biological agents require the injection point to be sufficiently separated from the active ozone in the wastewater. In the present disclosure, suitable active biological dose injection points are the reclaim tank 100, at any of the compartments 101, 102, 103.

Figure 2:
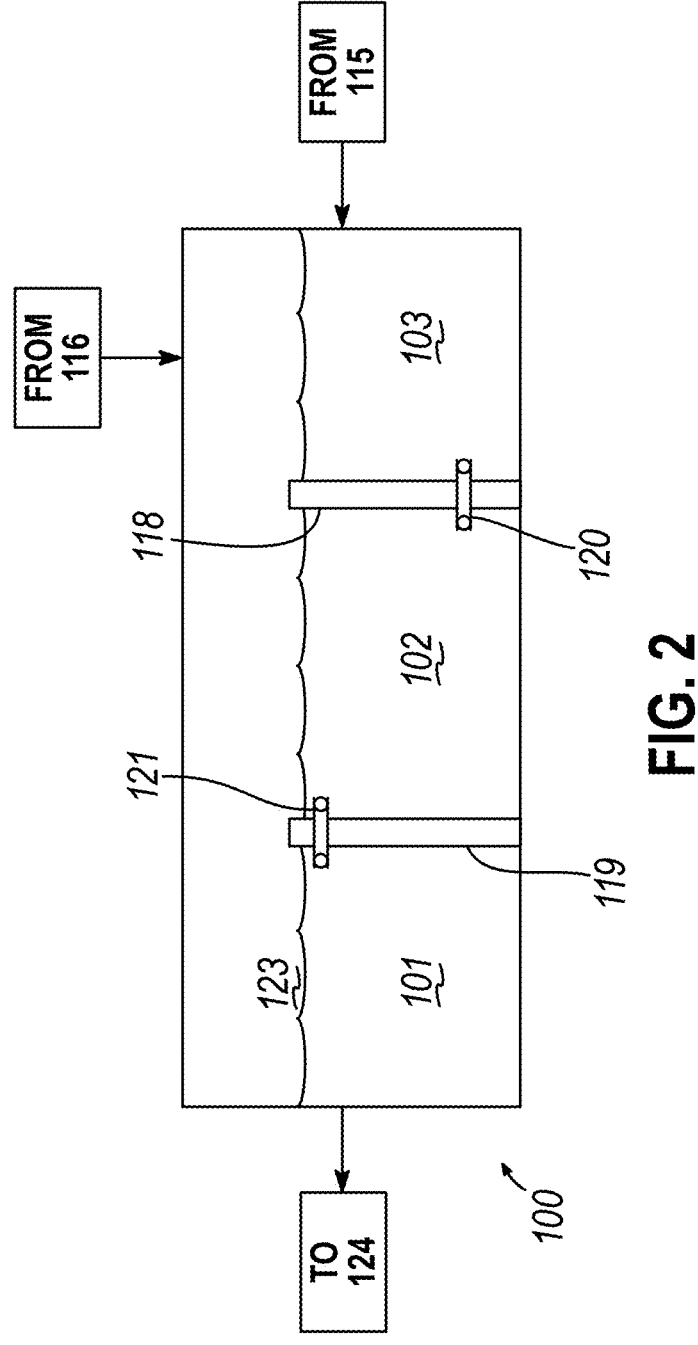
FIG. 2 shows an embodiment of an reclaim tank under the present disclosure.

FIG. 2 shows an embodiment of the reclaim tank 100 of FIG. 1. Reclaim tank can comprise three compartments 101, 102, 103. Input compartment 103 can receive water from bay trench 115 or underflow 126 from throttle valves 116a/b, or from dosing pump 117. From the input compartment 103 water can travel to second compartment 102 via first fluid conduit 120. From the second compartment 102 water can travel to final compartment 101 via second fluid conduit 121 that is placed just below the median tank water elevation 123. From reclaim tank 100, fluid can travel by suction line 124 to pump 105. Embodiments under the present disclosure can comprise a reclaim tank 100 that collects the entirety of wastewater generated by the facility. The reclaim tank 100 is preferably divided into three sections, but other numbers are possible. The sections can be defined by a pair of baffles 118, 119 that compartmentalize the reclaim tank. Penetrating the baffles 118, 119 can be apertures containing fluid conduits 120, 121 that minimize turbulence at the output of the conduit. Each compartment 101, 102, 103 within the reclaim tank 100 can be arranged to produce low flow velocity to enhance the settlement of solids from the wastewater. The input compartment 103 can be where the entirety of wastewater generated by the vehicle washing operation is deposited. This input compartment 103 can collect the majority of high-density solids such as sand, grit and metal fragments. The first fluid conduit 120 between the input 103 and second compartment 102 is below the normal water elevation of the input compartment. The depressed elevation of the first fluid conduit 120 is to cause low density solids such as insoluble oil and grease to collect in the input compartment. The second compartment 102 is disposed between the input 103 and final 101 compartments and is positioned to remove lighter sediment such as clays. The wastewater in the final compartment 101 is generally free of sand, grit and metal fragments which could damage the subsequent water treatment process equipment. Reclaim tank 100 is shown with three compartments 101, 102, 103. However, other numbers of compartments are possible. Generally, the more compartments used the cleaner the water will be. But any number of compartments can be used depending on the user's preferences or needs. Depending on the number of compartments used, the person of skill in the art will appreciate that the number of baffles and fluid conduits may be adjusted accordingly.

Figure 3:
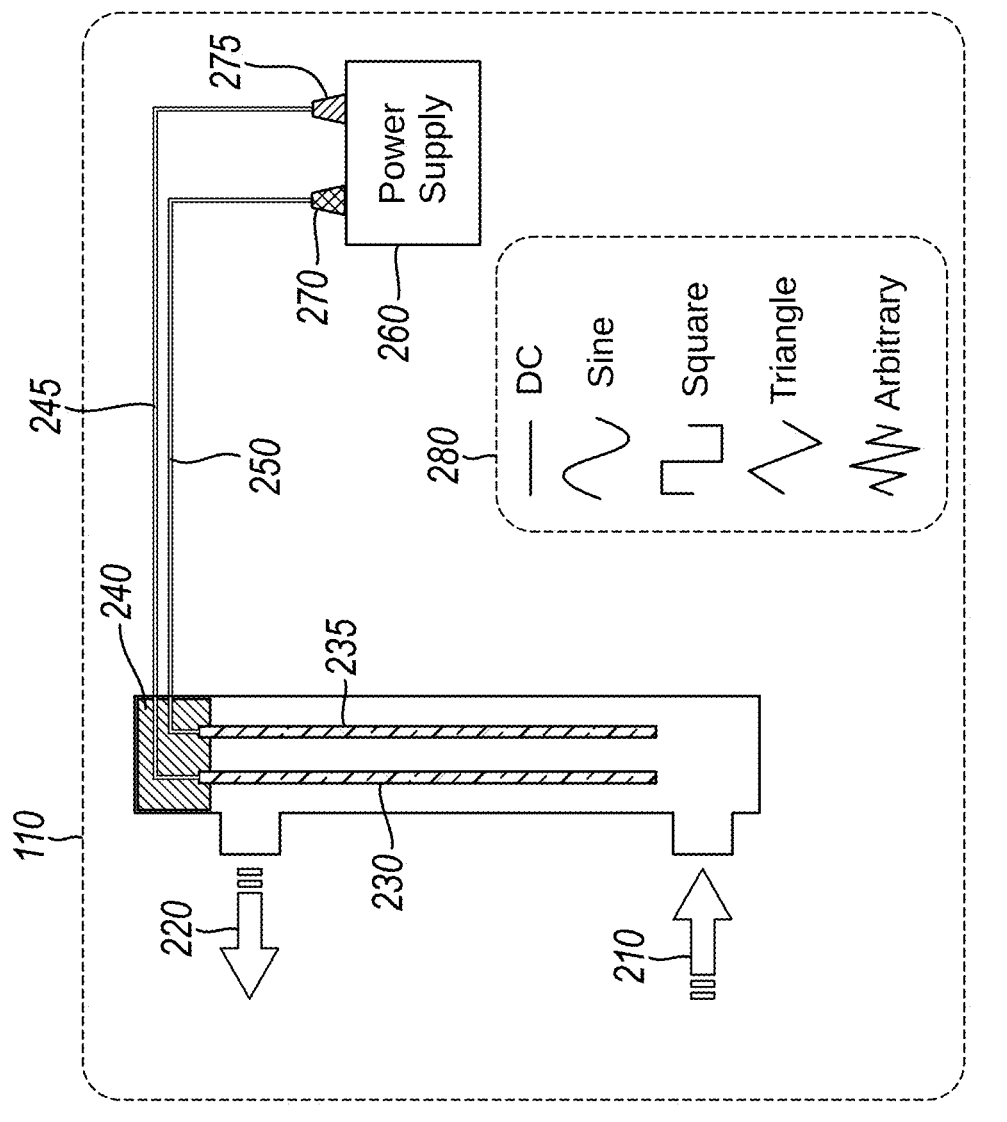
FIG. 3 shows an embodiment of an electro-chemical cell under the present disclosure.

FIG. 3 shows an embodiment of an electro-chemical cell 110. The liquid under process enters the electro-chemical cell 110 through a port 210. The liquid under process is passed by electrodes 230, 235. Electrodes 230, 235 are affixed to the electro-chemical cell 110 by means of a support 240 comprised of a di-electric material. Electrically conductive conduits 250, 255 to an electronic power supply 260. Each electrode 230, 235 is in electrical communication with an output terminal 270, 275 of the power supply 260. An electrical voltage potential is established between the output terminals 270, 275. The voltage potential 280 can be a time invariant signal (DC), or a time variant signal such as sine, square, triangle, or any arbitrary waveform.

Figure 4:
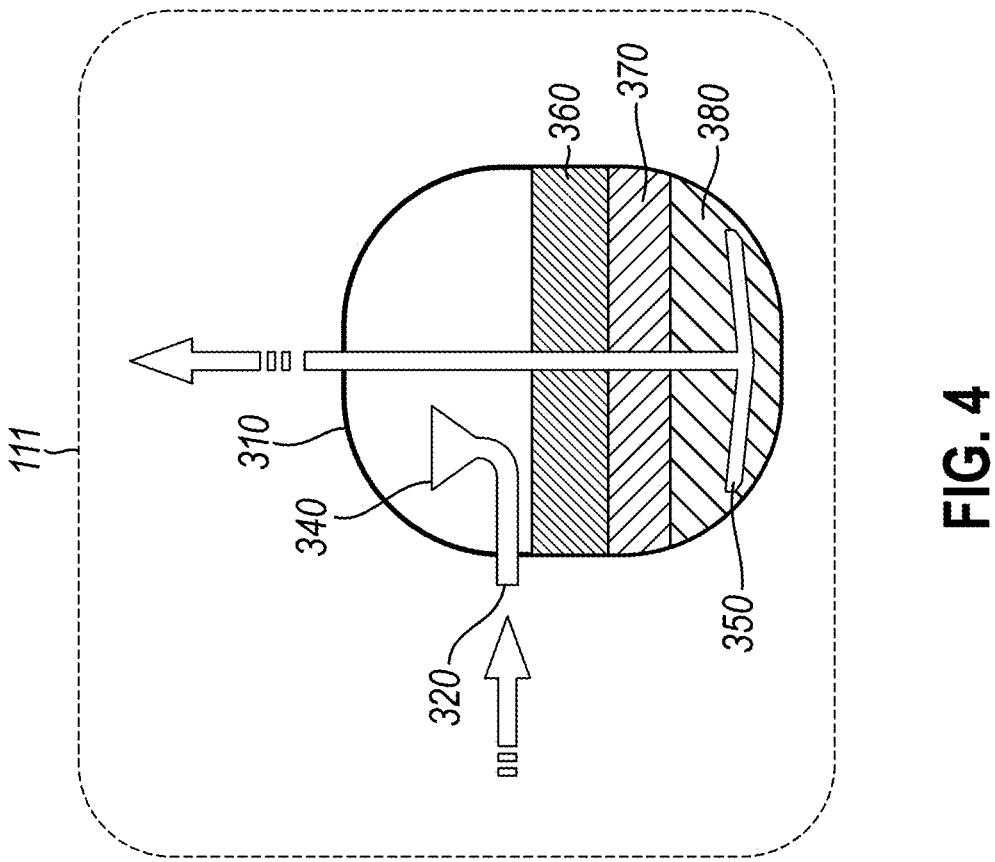
FIG. 4 shows media tiers embodiments in the polishing filter under the present disclosure.

FIG. 4 shows an embodiment of the polishing filter 111. Polishing filter 111 comprises a pressure vessel 310 to hold the contents of the vessel under pressure above atmospheric pressure. The liquid under process enters the pressure vessel 310 through port 320. Port 320 includes a distribution 340 to evenly distribute the influent above the media 360, 370, 380 to prevent channeling through the media 360, 370, 380. A lateral discharge 350 is used to fluidly conduct the liquid under process out from the pressure vessel 310. The tiers of media layers are deposited within the pressure vessel to preferentially retain suspended solids and retain dissolved solids through ion exchange processes. Examples of media 360 is gravel, media 370 glass beads or irregular particulate shape, media 380 ground walnut and coconut shell. Other materials are possible.

Figure 5:
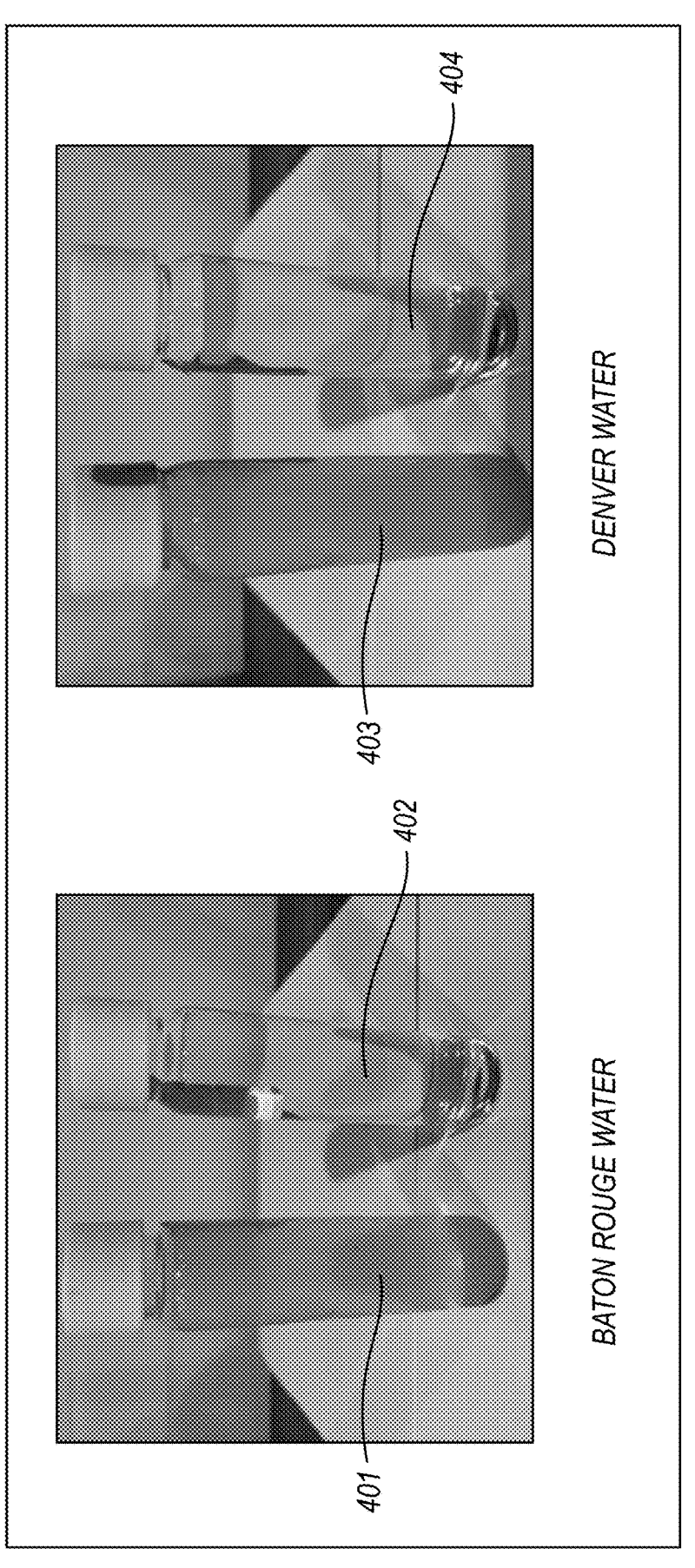
FIG. 5 shows the comparison of untreated vehicle wash water and treated water from Baton Rouge, LA and Denver, CO locations using certain embodiments of the present disclosure.

FIG. 5 is a picture of two examples of wastewater generated from certain vehicle washing operation embodiments under the present disclosure. Baton Rouge Raw Wastewater 401 is untreated wastewater taken from the Bay Trench 115. As seen in FIG. 5, the Baton Rouge Raw Wastewater 401 has dissolved and suspended solids as shown in Table 1 of FIG. 6. After processing the raw wastewater through the system described in FIG. 1, the Baton Rouge Raw Wastewater 402 is visibly clarified and its reduced Dissolved and Suspended Solids shown in Table 1. Denver Raw Wastewater 403 is untreated wastewater taken from the Bay Trench 115. As seen in the picture, the Denver Raw Wastewater 403 has dissolved and suspended solids as shown in Table 1. After processing the raw wastewater the Denver Raw Wastewater 404 is visibly clarified and its reduced dissolved and suspended solids are shown in Table 1. The results show the significant removal of total dissolved and suspended solids, softening and removal of metallic ions that decrease efficiency of surfactants in removing soil particles from vehicle surface. Other test results show significant reduction in carbon oxygen demand (5 day) to 4 mg/L, and residual bacteria to <1 Rlu.

FIG. 7 shows a possible method embodiment of regenerating water under the present disclosure. Step 710 is collecting wastewater (optionally from washing a vehicle) in a receptacle. Step 720 is receiving the wastewater from the receptacle in a reclaim tank, the reclaim tank configured to separate low and high density solids in the wastewater. Step 730 is drawing the wastewater from the reclaim tank with a pump configured to direct the wastewater to a reservoir. Step 740 is injecting, by an injector nozzle, oxidizer into the wastewater from the pump. Step 750 is applying, by an electro-chemical cell, a voltage to the wastewater from the injector nozzle, the electro-chemical cell comprising a plurality of electrodes configured to oxidize organic compounds in the wastewater. Step 760 is filtering, by a polishing filter, the wastewater from the electro-chemical cell, the polishing filter comprising filtration media operable to filter the wastewater, the wastewater then considered re-generated water. Step 770 is receiving, by the reservoir, the re-generated water from the polishing filter.

Reference has been made to a wastewater re-generation system for a car wash. However, the current disclosure can be used re-generation systems for a variety of applications. Commercial laundry operations, aircraft washing systems, and other systems that create or utilize wastewater can utilize the present teachings.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vehicle washing system comprising: a receptacle for wastewater; a reclaim tank configured to receive wastewater from the receptacle and to separate low and high density solids in wastewater; a pump operable to draw wastewater from the reclaim tank; an injector nozzle fluidly coupled downstream of the pump and operable to introduce oxidizer into the wastewater; a bypass circuit configured to bypass the injector nozzle and having lower flow resistance than the injector nozzle, the bypass circuit comprising a control valve operable to vary flow rate in the injector nozzle; a junction fluidly coupled downstream of, and configured to join fluid under process from, the bypass circuit and the injector nozzle; an electro-chemical cell fluidly coupled downstream of the junction and comprising a plurality of electrodes coated with Mixed Metal Oxides (MMO}, and wherein the plurality of electrodes are configured to have a voltage potential imposed between them to oxidize organic compounds when applied to the wastewater and resulting in forming Chlorine Dioxide (C102), wherein the voltage potential is imposed in a time variant manner during operation, and wherein the time variant manner in which voltage potential is imposed includes a plurality of non-zero voltages; a polishing filter fluidly coupled downstream of the electro-chemical cell and comprising a pressure vessel and a filtration media operable to filter the wastewater, wherein after the polishing filter the wastewater has become re-generated water; a reservoir fluidly coupled downstream of the polishing filter and operable to store re-generated water; and a washing apparatus fluidly coupled downstream of the reservoir and operable to apply the re-generated water to a vehicle.

2. A system for re-generating wastewater, comprising: a receptacle for wastewater;

a reclaim tank configured to receive wastewater from the receptacle;

a pump operable to draw wastewater from the reclaim tank;

an injector nozzle fluidly coupled downstream of the pump and operable to introduce oxidizer into the wastewater;

an electro-chemical cell fluidly coupled downstream of the injector nozzle and comprising a plurality of electrodes coated with Mixed Metal Oxides (MMO}, and wherein the plurality of electrodes are configured to have a voltage potential imposed between them to oxidize organic compounds when applied to the wastewater resulting in forming Chlorine Dioxide (C102), wherein the voltage potential is imposed in a time variant manner during operation; and, and wherein the time variant manner in which voltage potential is imposed includes a plurality of non-zero voltages; and a polishing filter fluidly coupled downstream of the electro-chemical cell and comprising filtration media operable to filter the wastewater, wherein after the polishing filter the wastewater has become re-generated water.

3. The system of claim 2 further comprising a hydrocyclone fluidly coupled between the pump and the injector nozzle and configured to reject high-density solids to an underflow.

4. The system of claim 2 wherein the reclaim tank comprises two or more baffles configured to divide the reclaim tank into an input compartment, a second compartment, and a final compartment, and wherein the input compartment and second compartment are fluidly coupled by a first conduit and the second compartment and the final compartment are fluidly coupled by a second conduit.

5. The system of claim 3 further comprising a throttle valve fluidly coupled between the reclaim tank and the hydrocyclone.

6. The system of claim 2 further comprising a throttle valve fluidly coupled between the reclaim tank and the injector nozzle.

7. A method of re-generating water in a vehicle washing system, comprising: collecting wastewater from washing a vehicle in a receptacle; receiving the wastewater from the receptacle in a reclaim tank, the reclaim tank configured to separate low and high density solids in the wastewater; drawing the wastewater from the reclaim tank with a pump configured to direct the wastewater to a reservoir; injecting, by an injector nozzle, oxidizer into the wastewater from the pump; applying, by an electro-chemical cell, a voltage potential between a plurality of electrodes coated with Mixed Metal Oxides (MMO}, wherein the voltage potential is imposed in a time variant manner during operation and is configured to oxidize organic compounds in the wastewater and result in the formation of Chlorine Dioxide (C102), and wherein the time variant manner in which voltage potential is imposed includes a plurality of non-zero voltages; and filtering, by a polishing filter, the wastewater from the electro-chemical cell, the polishing filter comprising filtration media operable to filter the wastewater, the wastewater then considered re-generated water; and receiving, by the reservoir, the re-generated water from the polishing filter.

8. The method of claim 7 further comprising supplying, by a dosing pump, chemical oxidizer to the reclaim tank.

9. The vehicle washing system of claim 1, further comprising a power supply coupled to the electro-chemical cell, the power supply operable to impose the voltage potential in a time variant manner during operation.

10. The vehicle washing system of claim 9, wherein the power supply applies the voltage potential in a time variant manner via direct current (DC).

11. The vehicle washing system of claim 9, wherein the power supply applies the voltage potential in a time variant manner via a sine waveform.

12. The vehicle washing system of claim 9, wherein the power supply applies the voltage potential in a time variant manner via a square waveform.

13. The vehicle washing system of claim 9, wherein the power supply applies the voltage potential in a time variant manner via a triangle waveform.

14. The vehicle washing system of claim 9, wherein the power supply applies the voltage potential in a time variant manner via an arbitrary waveform.

15. The vehicle washing system of claim 1, further comprising a controller operable to impose the voltage potential in a time variant manner during operation.

16. The system for re-generating wastewater of claim 2, further comprising a power supply coupled to the electro-chemical cell, the power supply operable to impose the voltage potential in a time variant manner during operation.

17. The system for re-generating wastewater of claim 2, further comprising a controller coupled to the electro-chemical cell, the controller operable to impose the voltage potential in a time variant manner during operation.

18. The method of re-generating water in a vehicle washing system of claim 7, wherein the applying the voltage potential by the electro-chemical cell is performed by a controller coupled to the electro-chemical cell.

* * * * *